United States Patent
Woo et al.

(10) Patent No.: US 11,431,214 B2
(45) Date of Patent: Aug. 30, 2022

(54) ROTOR AND MOTOR COMPRISING SAME

(71) Applicant: LG INNOTEK CO., LTD., Seoul (KR)

(72) Inventors: Shung Hun Woo, Seoul (KR); Jung Kyu Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 570 days.

(21) Appl. No.: 16/317,744

(22) PCT Filed: Jul. 12, 2017

(86) PCT No.: PCT/KR2017/007479
§ 371 (c)(1),
(2) Date: Jan. 14, 2019

(87) PCT Pub. No.: WO2018/012885
PCT Pub. Date: Jan. 18, 2018

(65) Prior Publication Data
US 2020/0185988 A1     Jun. 11, 2020

(30) Foreign Application Priority Data

Jul. 12, 2016 (KR) .................. 10-2016-0087830
Dec. 13, 2016 (KR) .................. 10-2016-0169540

(51) Int. Cl.
*H02K 1/27*     (2022.01)
*H02K 29/03*    (2006.01)
*H02K 1/278*    (2022.01)

(52) U.S. Cl.
CPC ............ *H02K 1/278* (2013.01); *H02K 29/03* (2013.01); *H02K 2213/03* (2013.01)

(58) Field of Classification Search
CPC .... H02K 29/03; H02K 1/278; H02K 2213/03; H02K 1/146; H02K 1/2733; H02K 1/274; H02K 5/04; B62D 5/046
(Continued)

(56) References Cited

U.S. PATENT DOCUMENTS 5,886,440 A * 3/1999 Hasebe .................. H02K 1/278
                                                       310/156.19
2009/0315424 A1  12/2009 Vollmer
(Continued)

FOREIGN PATENT DOCUMENTS

CN     103312062 A     9/2013
CN     105048748 A     11/2015
(Continued)

OTHER PUBLICATIONS

Translation of foreign document JP 2001339921 A (Year: 2001).*
(Continued)

*Primary Examiner* — Alex W Mok
(74) *Attorney, Agent, or Firm* — Saliwanchik, Lloyd & Eisenschenk

(57) ABSTRACT

The present invention provides rotor including: a rotor core having a cylindrical shape; and a plurality of magnets disposed to surround an outer circumferential surface of the rotor core, wherein the magnet includes an inner circumferential surface in contact with the outer circumferential surface of the rotor core, when a first angle is defined by dividing an angle formed by the outer circumferential surface of the rotor core by the number of magnets, a second angle is formed by a first extension line and a second extension line which extend from both end points of the inner circumferential surface of the magnet to a center point of the rotor core on cross sections of the rotor core and the magnet, and a ratio of the second angle to the first angle is in a range of 0.87 to 0.93, thereby providing an advantageous effect of greatly reducing a cogging torque by decreasing a width of the magnet to double a cogging main degree.

16 Claims, 14 Drawing Sheets

(58) Field of Classification Search
USPC .................................................. 310/156.01
See application file for complete search history.

(56) References Cited

U.S. PATENT DOCUMENTS

| | | | |
|---|---|---|---|
| 2013/0088114 A1* | 4/2013 | Yamashita | H02K 15/03 |
| | | | 310/156.38 |
| 2014/0265706 A1* | 9/2014 | Yamada | H02K 1/24 |
| | | | 310/156.43 |
| 2015/0145370 A1* | 5/2015 | Taniguchi | H02K 29/03 |
| | | | 310/156.28 |

FOREIGN PATENT DOCUMENTS

| | | |
|---|---|---|
| JP | 2001-339921 A | 12/2001 |
| JP | 2005-341688 A | 12/2005 |
| JP | 2009-148158 A | 7/2009 |
| JP | 2013-188005 A | 9/2013 |
| KR | 10-2016-0061834 | 6/2016 |

OTHER PUBLICATIONS

International Search Report dated Oct. 17, 2017 in International Application No. PCT/KR2017/007479.
Office Action dated Apr. 17, 2020 in Chinese Application No. 201780043682.6.

* cited by examiner

| NUMBER OF POLES | NUMBER OF SLOTS | COGGING MAIN DEGREE |
|---|---|---|
| 6 | 9 | 18 |

| NUMBER OF POLES | NUMBER OF SLOTS | COGGING MAIN DEGREE |
|---|---|---|
| 6 | 9 | 36 |

FIG. 14

| Item | Unit | TARGET | COMPARATIVE EMBODIMENT | EMBODIMENT |
|---|---|---|---|---|
| MW | [%] | - | 0.885 | 0.93 |
| MOF | [mm] | - | 5.3 | 8.8 |
| COGGING TORQUE | [Nm] | Max 0.030 | 0.0158 | 0.001 |
| HIGH-SPEED TORQUE RIPPLE | [Nm] | Max 0.027 | 0.1758 | 0.0054 |
| LOW-SPEED TORQUE RIPPLE | [Nm] | Max 0.115 | 0.0614 | 0.0130 |
| MAXIMUM TORQUE | [Nm] | Min 3.2 | 3.4527 | 3.2432 |

ROTOR AND MOTOR COMPRISING SAME

CROSS-REFERENCE TO RELATED APPLICATIONS

This application is the U.S. national stage application of International Patent Application No. PCT/KR2017/007479, filed Jul. 12, 2017, which claims the benefit under 35 U.S.C. § 119 of Korean Application Nos. 10-2016-0087830, filed Jul. 12, 2016, and 10-2016-0169540, filed Dec. 13, 2016, the disclosures of each of which are incorporated herein by reference in their entirety.

TECHNICAL FIELD

The present invention relates to a rotor and a motor including the same.

BACKGROUND ART

An electric power steering (EPS) system is an apparatus which secures turning stability of a vehicle and rapidly provides a restoring force so that a driver can safely travel. The EPS system drives a motor using an electronic control unit (ECU) according to traveling conditions which are detected by a vehicle speed sensor, a torque angle sensor, and a torque sensor to control driving of a steering shaft of the vehicle.

The motor includes a stator and a rotor. The stator may include teeth which form a plurality of slots, and the rotor may include a plurality of magnets facing the teeth. The adjacent teeth are disposed to be spaced apart from each other to form a slot open. Here, a cogging torque may be generated due to a difference in magnetic permeability between the stator formed of a metal, and the slot open, which is an empty space when the rotor rotates. Since such a cogging torque is a cause of noise and vibration, reduction of the cogging torque is the most important to improve quality of the motor.

Particularly, a torque ripple may be generated in a high-speed condition, and the torque ripple may cause a vibration problem in a steering apparatus.

DISCLOSURE

Technical Problem

The present invention is directed to providing a motor capable of reducing a cogging torque and a torque ripple.

Objectives that have to be solved according to the embodiments are not limited to the above described objectives, and other objectives which are not described above will be clearly understood by those skilled in the art from the following specification.

One aspect of the present invention provides a rotor including a rotor core having a cylindrical shape and including a plurality of magnets disposed to surround an outer circumferential surface of the rotor core, wherein the magnet includes an inner circumferential surface in contact with the outer circumferential surface of the rotor core, when a first angle is defined by dividing an angle formed by the outer circumferential surface of the rotor core by the number of magnets, a second angle is formed by a first extension line and a second extension line which extend from both end points of the inner circumferential surface of the magnet to a center point of the rotor core on cross sections of the rotor core and the magnet, and a ratio of the second angle to the first angle is in a range of 0.87 to 0.93.

The number of magnets may be six.

The number of magnets may be eight.

The rotor may further include a can member which accommodates the rotor core and the magnet.

The plurality of magnets may be disposed in a single stage on the outer circumferential surface of the rotor core, and the plurality of magnets may be disposed to be spaced a predetermined distance from each other.

A height of the rotor core may be the same as that of the magnet on the basis of a longitudinal section of the rotor core and a longitudinal section of the magnet.

Another aspect of the present invention provides a motor including a rotating shaft, a rotor including a hole into which the rotating shaft is inserted, and a stator disposed outside the rotor, wherein the rotor includes a rotor core which surrounds the rotating shaft and includes a magnet disposed on an outer circumferential surface of the rotor core, and the stator includes a stator core having a plurality of teeth, the number of vibrations of a cogging torque wave per unit rotation is two times a least common multiple of the number of magnets and the number of teeth.

The magnet may include an inner circumferential surface in contact with the outer circumferential surface of the rotor core, when a first angle is defined by dividing an angle formed by the outer circumferential surface of the rotor core by the number of magnets, a second angle may be formed by a first extension line and a second extension line which extend from both end points of the inner circumferential surface of the magnet to a center point of the rotor core on cross sections of the rotor core and the magnet, and a ratio of the second angle to the first angle may be in a range of 0.87 to 0.93.

The number of magnets may be six, and the number of teeth may be nine.

The number of magnets may be eight, and the number of teeth may be twelve.

The motor may further include a can member which accommodates the rotor core and the magnet.

The plurality of magnets may be disposed in a single stage on the outer circumferential surface of the rotor core, and the plurality of magnets may be disposed to be spaced a predetermined distance from each other.

A height of the rotor core may be the same as that of the magnet on the basis of a longitudinal section of the rotor core and a longitudinal section of the magnet.

Still another aspect of the present invention provides a motor including a rotating shaft, a rotor including a hole into which the rotating shaft is inserted, and a stator disposed outside the rotor, wherein the rotor includes a rotor core which surrounds the rotating shaft and a magnet disposed on an outer circumferential surface of the rotor core, the magnet includes an inner circumferential surface in contact with the outer circumferential surface of the rotor core, when a first angle is defined by dividing an angle formed by the outer circumferential surface of the rotor core by the number of magnets, a second angle is formed by a first extension line and a second extension line which extend from both end points of the inner circumferential surface of the magnet to a center point of the rotor core on cross sections of the rotor core and the magnet, and a ratio of the second angle to the first angle is in a range of 0.87 to 0.93 The number of vibrations of a cogging torque wave per unit rotation may be two times a least common multiple of the number of magnets and the number of teeth.

The number of magnets may be six, and the number of teeth may be nine.

The number of magnets may be eight, and the number of teeth may be twelve.

The motor may further include a can member which accommodates the rotor core and the magnet.

The plurality of magnets may be disposed in a single stage on the outer circumferential surface of the rotor core, and the plurality of magnets may be disposed to be spaced a predetermined distance from each other.

A height of the rotor core may be the same as that of the magnet on the basis of a longitudinal section of the rotor core and a longitudinal section of the magnet.

Yet another aspect of the present invention provides a rotor including a rotor core having a cylindrical shape and including a plurality of magnets disposed to surround an outer circumferential surface of the rotor core, wherein the magnet includes an inner circumferential surface in contact with the outer circumferential surface of the rotor core, when a first angle is defined by dividing an angle formed by the outer circumferential surface of the rotor core by the number of magnets, a second angle is formed by a first extension line and a second extension line which extend from both end points of the inner circumferential surface of the magnet to a center point of the rotor core on cross sections of the rotor core and the magnet, and a ratio of the second angle to the first angle is in a range of 0.92 to 0.95.

When a radius of a curvature of an outer circumferential surface of the magnet is referred to as a first radius and a radius of a curvature of the inner circumferential surface of the magnet is referred to as a second radius on cross sections of the rotor core and the magnet, a ratio of the first radius to the second radius may be in a range of 0.5 to 0.7.

A center of a curvature of the outer circumferential surface of the magnet may be disposed outside a center of a curvature of the inner circumferential surface of the magnet in a radius direction of the rotor core.

The center of the curvature of the outer circumferential surface of the magnet may be colinear with the center of the curvature of the inner circumferential surface of the magnet in the radius direction of the rotor core.

The number of magnets may be six.

The number of the magnets may be eight.

The rotor may further include a can member which accommodates the rotor core and the magnet.

The plurality of magnets may be disposed in a single stage on the outer circumferential surface of the rotor core, and the plurality of magnets may be disposed to be spaced a predetermined distance from each other.

A height of the rotor core may be the same as that of the magnet on the basis of a longitudinal section of the rotor core and a longitudinal section of the magnet.

Yet another aspect of the present invention provides a rotor including a rotor core having a cylindrical shape and including a plurality of magnets disposed to surround an outer circumferential surface of the rotor core, wherein the magnet includes an inner circumferential surface in contact with the outer circumferential surface of the rotor core, and when a radius of a curvature of the outer circumferential surface of the magnet is referred to as a first radius and a radius of a curvature of the inner circumferential surface of the magnet is referred to as a second radius on cross sections of the rotor core and the magnet, a ratio of the first radius to the second radius is in a range of 0.5 to 0.7.

When a first angle is defined by dividing an angle formed by the outer circumferential surface of the rotor core by the number of magnets, a second angle may be formed by a first extension line and a second extension line which extend from both end points of the inner circumferential surface of the magnet to a center point of the rotor core on cross sections of the rotor core and the magnet, and a ratio of the second angle to the first angle may be in a range of 0.92 to 0.95.

A center of a curvature of the outer circumferential surface of the magnet may be disposed outside a center of a curvature of the inner circumferential surface of the magnet in a radius direction of the rotor core.

The center of the curvature of the outer circumferential surface of the magnet may be colinear with the center of the curvature of the inner circumferential surface of the magnet in the radius direction of the rotor core.

The number of magnets may be six.

The number of the magnets may be eight.

The rotor may further include a can member which accommodates the rotor core and the magnet.

The plurality of magnets may be disposed in a single stage on the outer circumferential surface of the rotor core, and the plurality of magnets may be disposed to be spaced a predetermined distance from each other.

Yet another aspect of the present invention provides a motor including a rotating shaft, a rotor including a hole into which the rotating shaft is inserted, and a stator disposed outside the rotor, wherein the rotor includes a rotor which surrounds the rotating shaft and a magnet disposed on an outer circumferential surface of the rotor core, and the stator includes a stator core having a plurality of teeth, the magnet includes an inner circumferential surface in contact with the outer circumferential surface of the rotor core, when a first angle is defined by dividing an angle formed by the outer circumferential surface of the rotor core by the number of magnets, a second angle is formed by a first extension line and a second extension line which extend from both end points of the inner circumferential surface of the magnet to a center point of the rotor core on cross sections of the rotor core and the magnet, and a ratio of the second angle to the first angle is in a range of 0.92 to 0.95

When a radius of a curvature of an outer circumferential surface of the magnet is referred to as a first radius and a radius of a curvature of the inner circumferential surface of the magnet is referred to as a second radius on cross sections of the rotor core and the magnet, a ratio of the first radius to the second radius may be in a range of 0.5 to 0.7.

Yet another aspect of the present invention provides a motor including a rotating shaft, a rotor including a hole into which the rotating shaft is inserted, and a stator disposed outside the rotor, wherein the rotor includes a rotor core which surrounds the rotating shaft and includes a magnet disposed on an outer circumferential surface of the rotor core, the magnet includes an inner circumferential surface in contact with the outer circumferential surface of the rotor core, and when a radius of a curvature of an outer circumferential surface of the magnet on cross sections of the rotor core and the magnet is referred to as a first radius and a radius of a curvature of the inner circumferential surface of the magnet is referred to as a second radius on cross sections of the rotor core and the magnet, a ratio of the first radius to the second radius is in a range of 0.5 to 0.7.

When a first angle is defined by dividing an angle formed by the outer circumferential surface of the rotor core by the number of magnets, a second angle may be formed by a first extension line and a second extension line which extend from both end points of the inner circumferential surface of the magnet to a center point of the rotor core on cross sections of the rotor core and the magnet, and a ratio of the second angle to the first angle may be in a range of 0.92 to 0.95.

Advantageous Effects

According to an embodiment, an advantageous effect is provided in that a cogging torque is greatly reduced by decreasing a width of a magnet to double a cogging main degree.

DESCRIPTION OF DRAWINGS

FIG. 14 is a comparison table in which a cogging torque and a torque ripple of a comparative embodiment and the cogging torque and the torque ripple of the embodiment are compared.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. Terms and words used in this specification and claims are not to be interpreted as limited to commonly used meanings or meanings in dictionaries, and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

Figure 1:
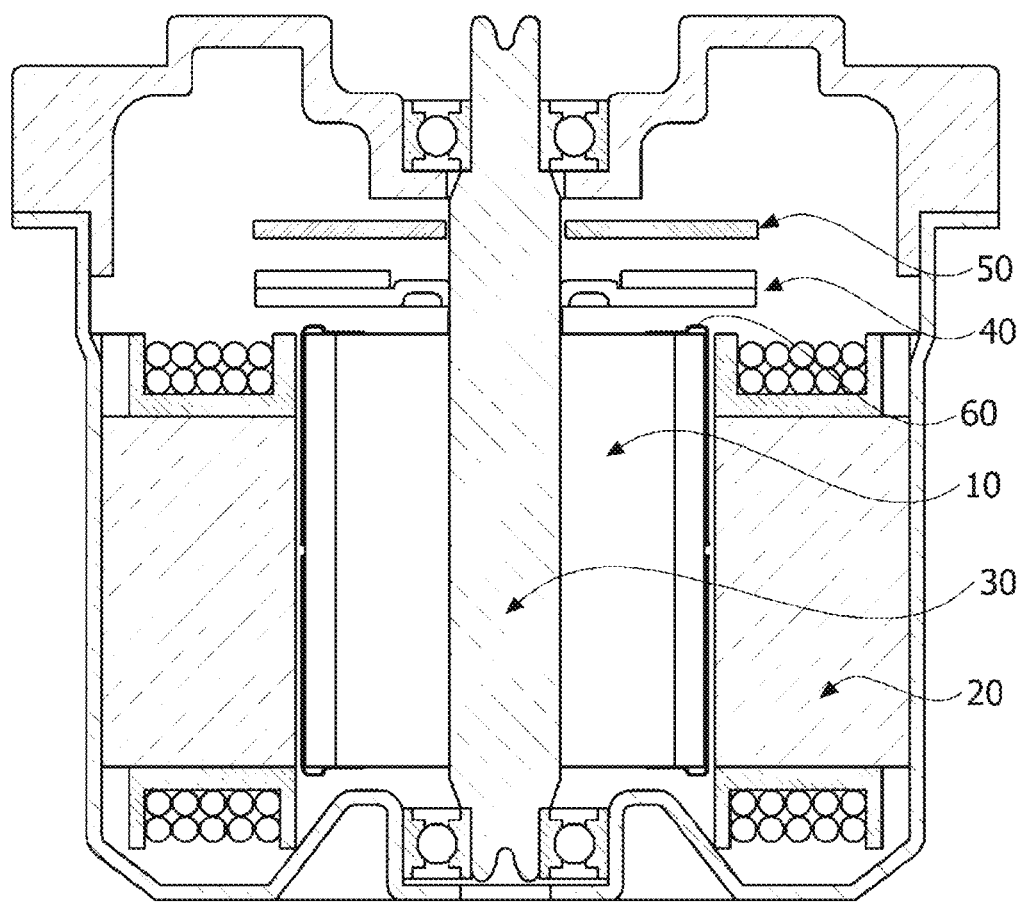
FIG. 1 is a view illustrating a motor according to an embodiment.
Figure 2:
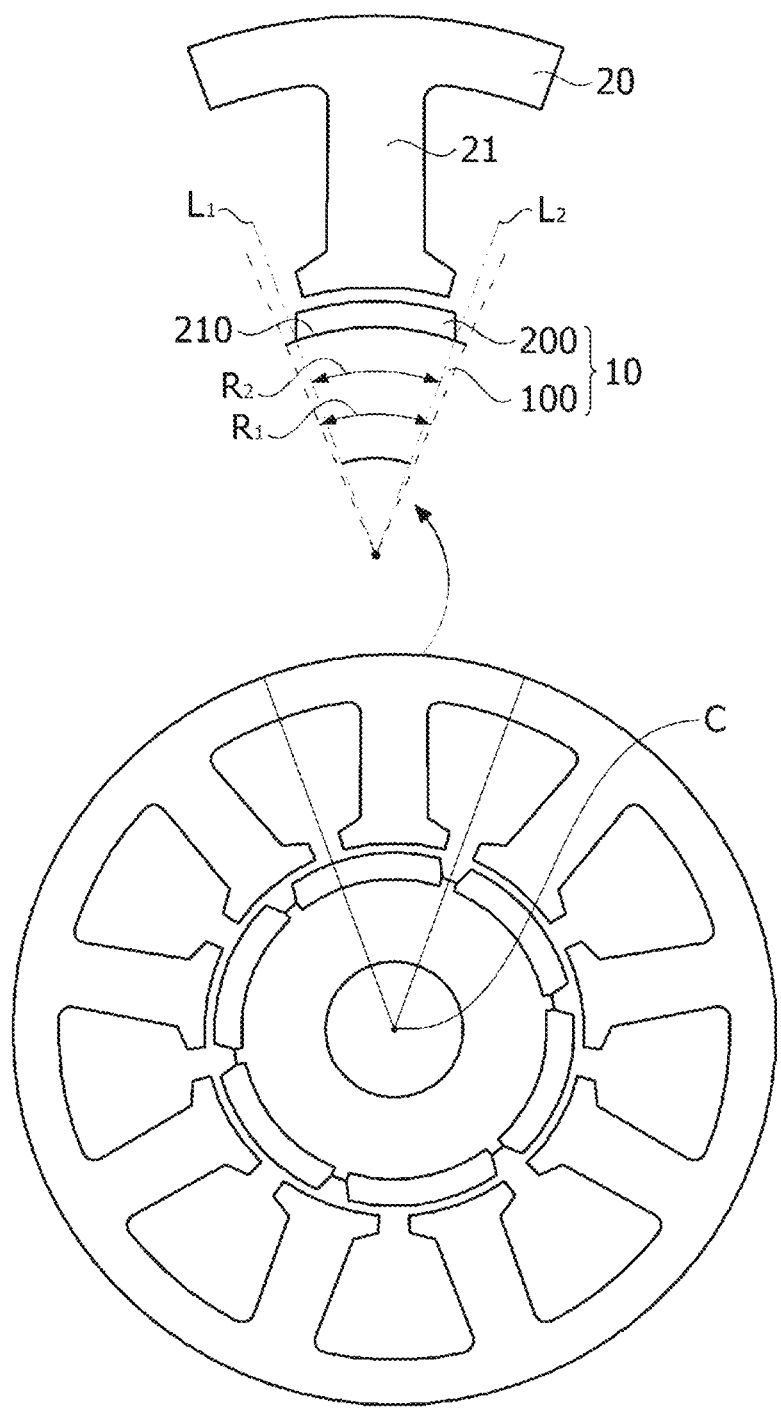
FIG. 2 is a view illustrating a first angle and a second angle.
Figure 3:
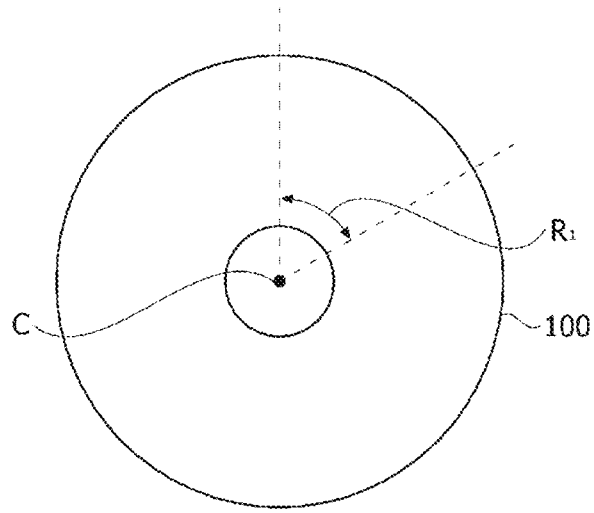
FIG. 3 is a view illustrating the first angle.

FIG. 1 is a view illustrating a motor according to an embodiment, FIG. 2 is a view illustrating a first angle and a second angle, and FIG. 3 is a view illustrating the first angle.

Referring to FIG. 1, the motor according to the embodiment may include a rotor 10, a stator 20, a rotating shaft 30, and a sensing magnet 40.

The rotor 10 is rotated due to an electrical interaction with the stator 20.

Coils may be wound around the stator 20 to induce the electrical interaction with the rotor 10. A specific configuration of the stator 20 to wind the coils therearound will be described below. The stator 20 may include a stator core including a plurality of teeth. A ring-shaped yoke portion and the teeth around which the coils are wound in a central direction from the yoke portion may be provided in the stator core. The teeth may be provided with a predetermined interval along an outer circumferential surface of the yoke portion. Meanwhile, the stator core may be formed of a plurality of thin steel plates being stacked. In addition, the stator core may be formed of a plurality of separate cores being coupled or connected to each other.

An insulator is coupled to the teeth of the stator and serves to electrically insulate the coils from the stator core.

The rotating shaft 30 may be coupled to the rotor 10. When an electromagnetic interaction occurs between the rotor 10 and the stator 20 due to a current being supplied, the rotor 10 rotates and the rotating shaft 30 rotates in conjunction with the rotor 10. The rotating shaft 30 may be connected to a steering shaft of a vehicle to transmit power to the steering shaft. The rotating shaft 30 may be supported by bearings.

The sensing magnet 40 is an apparatus coupled to the rotating shaft 30 to operate in conjunction with the rotor 10 in order to detect a position of the rotor 10. The sensing magnet may include a magnet and a sensing plate. The magnet and the sensing plate may be coupled to have the same axis.

A sensor configured to detect a magnetic force of the sensing magnet may be disposed on a printed circuit board 50. Here, the sensor may be a Hall integrated circuit (IC). The sensor detects a change in N and S poles of a main magnet or sub-magnet to generate a sensing signal. The printed circuit board 50 may be coupled to a lower surface of a cover of a housing and installed above the sensing magnet to face the sensing magnet.

Meanwhile, referring to FIG. 2, the rotor 10 may include a rotor core 100 and magnets 200 coupled to the rotor core 100. The rotor 10 may be variously classified according to a coupling type between the rotor core and the magnets. Among various type rotors, the motor may include a rotor in a type in which magnets are coupled to an outer circumferential surface of a rotor core. In the rotor 10 having the above type, a separate can member 60 (see FIG. 1) may be coupled to the rotor core in order to inhibit detachment of the magnets and increase a coupling force.

Meanwhile, the rotor 10 may be formed with the rotor core 100 which is a cylindrical single unit and the magnets 200 each disposed in a single stage on the rotor core 100. Here, the meaning of the single stage is that the magnet 200 may be disposed on the outer circumferential surface of the rotor 10 without a skew. Accordingly, a height of the rotor core 100 and a height of the magnet 200 may be the same based on a longitudinal section of the rotor core 100 and a longitudinal section of the magnet 200. That is, the magnets 200 may cover an entirety of the rotor core 100 in a height direction.

In the motor according to the embodiment, a width of the magnet 200 is decreased to increase the number of vibrations of a cogging torque wave per unit period in order to greatly reduce a cogging torque and a torque ripple. The specific description about this will be given below. When the embodiment is described, the width of the magnet 200 may be defined as a length of an arc of an inner circumferential surface of the magnet 200 in contact with the rotor core 100.

Referring to FIGS. 2 and 3, the plurality of magnets 200 may be attached to the outer circumferential surface of the rotor core 100. In addition, the stator 20 may include the plurality of teeth 21. The magnets 200 may be disposed to face the teeth 21.

For example, the motor may be a 6-pole 9-slot motor in which six magnets 200 and nine teeth 21 are provided. The number of teeth 21 corresponds to the number of slots. In addition, the N and S poles of the magnets 200 may be alternately disposed.

To describe the embodiment, the number of magnets 200 is six and the number of teeth 21 is nine, but the embodiment is not limited thereto, and the number of magnets 200 and the number of teeth 21 may be different therefrom (for example, the number of magnets 200 may be eight and the number of teeth 21 may be twelve.).

The inner circumferential surface 210 of the magnet 200 is in contact with the outer circumferential surface of the rotor core 100. The width of the magnet 200 of the motor according to the embodiment may be described using a first angle R1 and a second angle R2.

First, the first angle R1 is an angle in which 360°, which is an angle of the outer circumferential surface of the rotor core 100, is divided by the number of magnets 200. For example, in the case in which the number of magnets 200 is six, the first angle R1 is 60°. A length of an arc of the rotor core 100 corresponding to the first angle R1 is a reference for setting the width of the magnet 200. Here, the actual width of the magnet 200 may be adjusted by considering a width of a protrusion formed from the outer circumferential surface of the rotor core 100 and configured to guide the magnet 200.

Next, the second angle R2 is an angle formed between a first extension line L1 and a second extension line L2. Here, the first extension line L1 is a virtual line which extends from one end point of any one side of the inner circumferential surface 210 on a cross section of the magnet 200 to a center point C of the rotor core 100. Here, the cross section of the magnet 200 is a cross section of the magnet 200 which is cut in a direction perpendicular to a shaft direction of the motor.

A length of an arc of the rotor core 100 corresponding to the second angle R2, which is an angle between the first extension line L1 and the second extension line L2, is another reference for setting the width of the magnet 200.

The first angle R1 is an angle for setting a width of a conventional magnet 200, and the second angle R2 is an angle which is a reference for setting the width of the magnet 200, which is less than the width of the magnet 200 set on the basis of the first angle R1.

Figure 4:
FIG. 4 is a table showing a cogging main degree which increases according to the embodiment.
Figure 5:
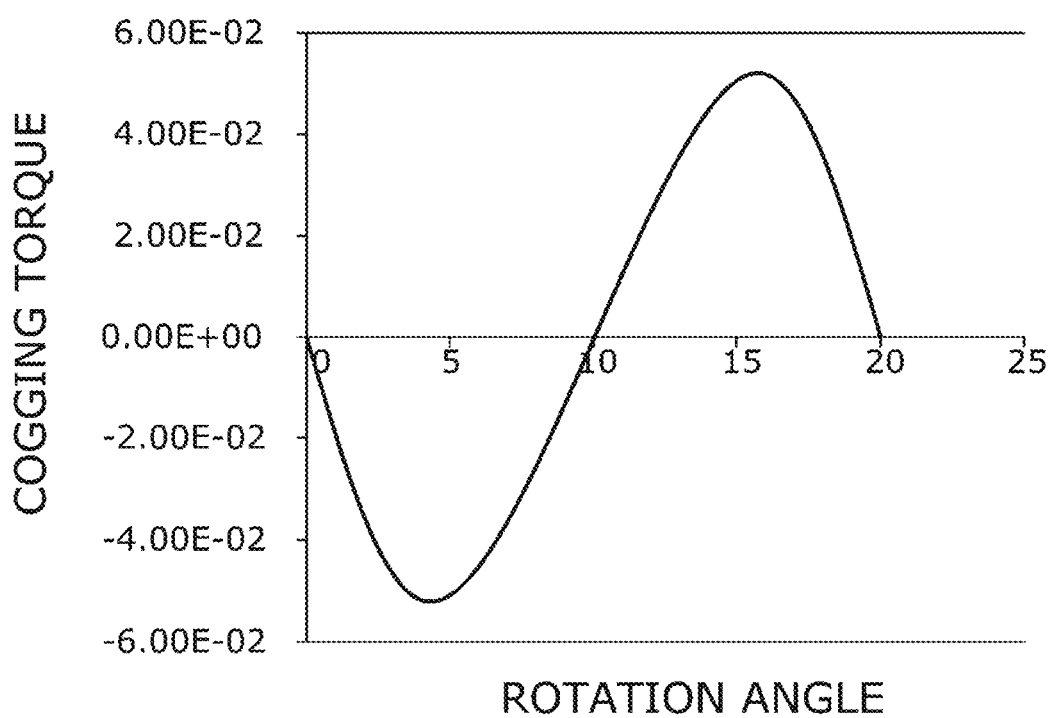
FIG. 5 is a graph showing a period of a cogging torque wave of a motor.
Figure 6:
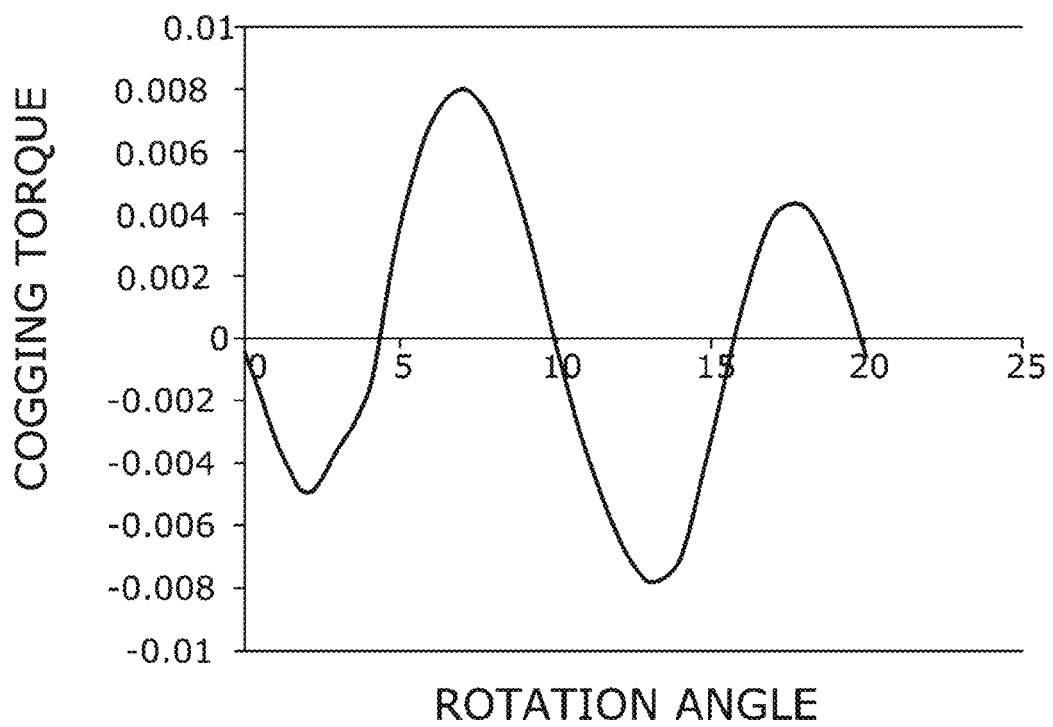
FIG. 6 is a graph showing a cogging torque wave of a motor including a magnet having a width corresponding to the first angle.

FIG. 4 is a table showing a cogging main degree which increases according to the embodiment, FIG. 5 is a graph showing a period of a cogging torque wave of a motor, and FIG. 6 is a graph showing a cogging torque wave of a motor including a motor having a width corresponding to the first angle.

Referring to FIG. 4, in the case of a 6-pole 9-slot motor, a cogging main degree corresponds to eighteen, which is a least common multiple of six, which is the number of magnets 200, and nine, which is the number of slots. The cogging main degree is the number of vibrations of the cogging torque wave per unit rotation (one rotation) of the motor. Here, the number of vibrations is the number of repetitions of the cogging torque wave forming peaks.

Referring to FIG. 5, a shape of a wave of a cogging torque of the motor including six poles and nine slots has a mechanical period of 20°. In the mechanical period of 20°, the number of vibrations of the cogging torque wave is one. Accordingly, in a case in which the motor rotates once, the number of vibrations of the cogging torque wave is eighteen on the basis of the period of 20°, and eighteen is the cogging main degree.

The cogging main degree may be simply calculated through a least common multiple of the number of magnets 200 and the number of slots. For example, in the case of the motor including six poles and nine slots, the cogging main degree is eighteen, which is a least common multiple of six and nine. In the case of the motor including eight poles and twelve slots, the cogging main degree is twenty-four, which is a least common multiple of eight and twelve.

In the motor according to the embodiment, by decreasing the width of the magnet 200, the cogging main degree is doubled in order to decrease the cogging torque, as illustrated in FIG. 4. The meaning of the cogging main degree being doubled is that the number of vibrations of the cogging torque wave is doubled per unit period such that an absolute value of the cogging torque is decreased.

As illustrated in FIG. 6, in a case in which the cogging main degree is increased to thirty-six from eighteen based on the period of 20°, it can be seen that the number of vibrations of the cogging torque wave is increased to two and the cogging torque is decreased.

The first angle R1 is the angle for setting the width of the conventional magnet 200, and the second angle R2 is the angle which is the reference for setting the width of the magnet 200, which is less than that of the magnet 200 set on the basis of the first angle R1.

Here, when a ratio of the second angle R2 to the first angle R1 is in the range of 0.87 to 0.93, the cogging main degree may be doubled.

Figure 7:
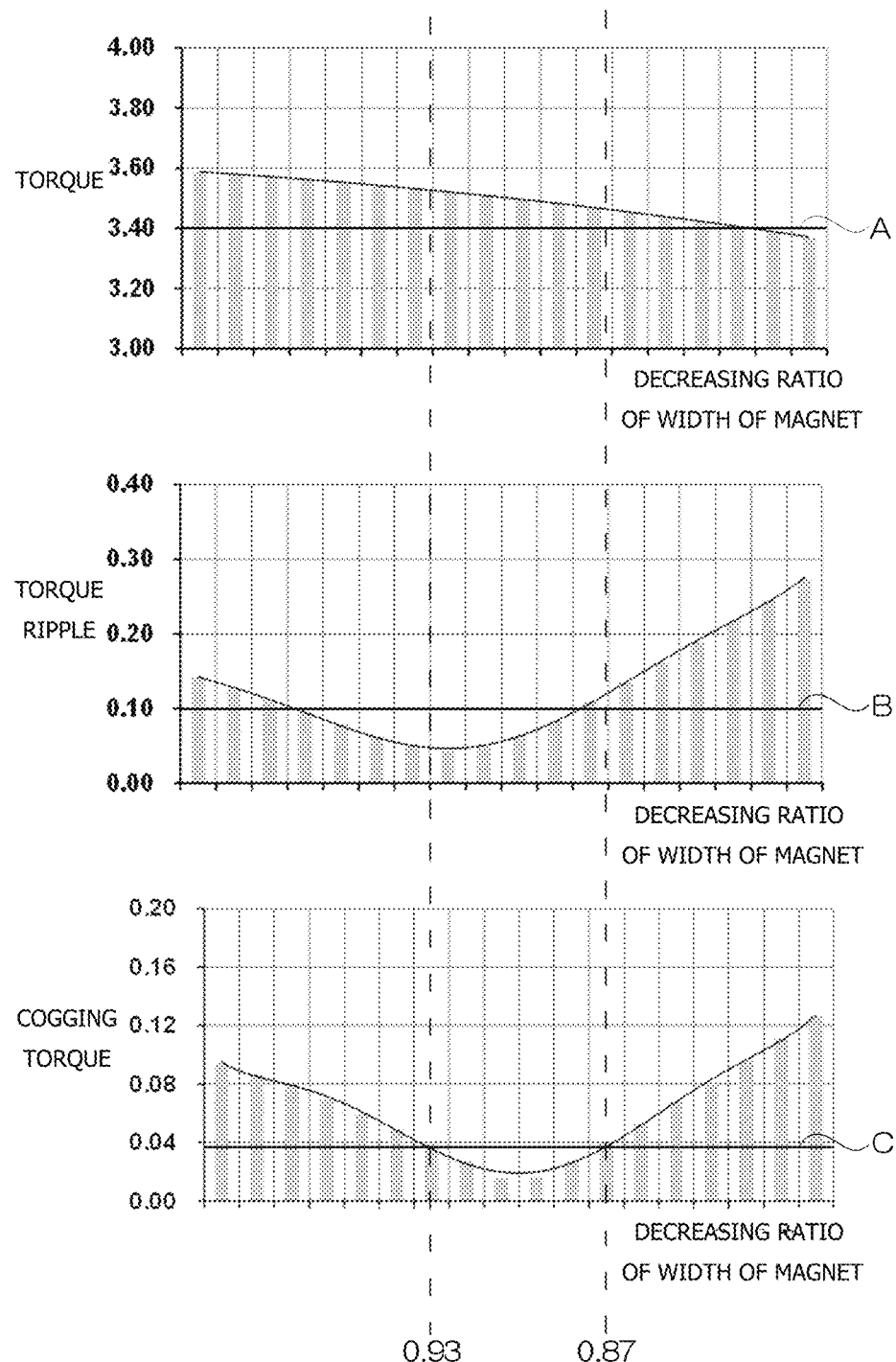
FIG. 7 shows comparative graphs showing values of a torque, a torque ripple, and a cogging torque corresponding to a decreasing ratio of the width of the magnet.

FIG. 7 shows comparative graphs showing values of a torque, a torque ripple, and a cogging torque corresponding to a decreasing ratio of the width of the magnet.

Referring to FIG. 7, it can be seen that the cogging torque, which is lower than a reference line C representing a target reference of a cogging torque, is measured at a point at which the ratio of the second angle R2 to the first angle R1 is in the range of 0.87 to 0.93.

In addition, it can be seen that the torque ripple, which is lower than a reference line B representing a target reference of a torque ripple, is also measured at the point at which the ratio of the second angle R2 to the first angle R1 is in the range of 0.87 to 0.93.

In addition, it can be seen that the torque, which is higher than a reference line A representing a target reference of a torque, is also measured at the point at which the ratio of the second angle R2 to the first angle R1 is in the range of 0.87 to 0.93, thereby satisfying a desired torque.

Figure 8:
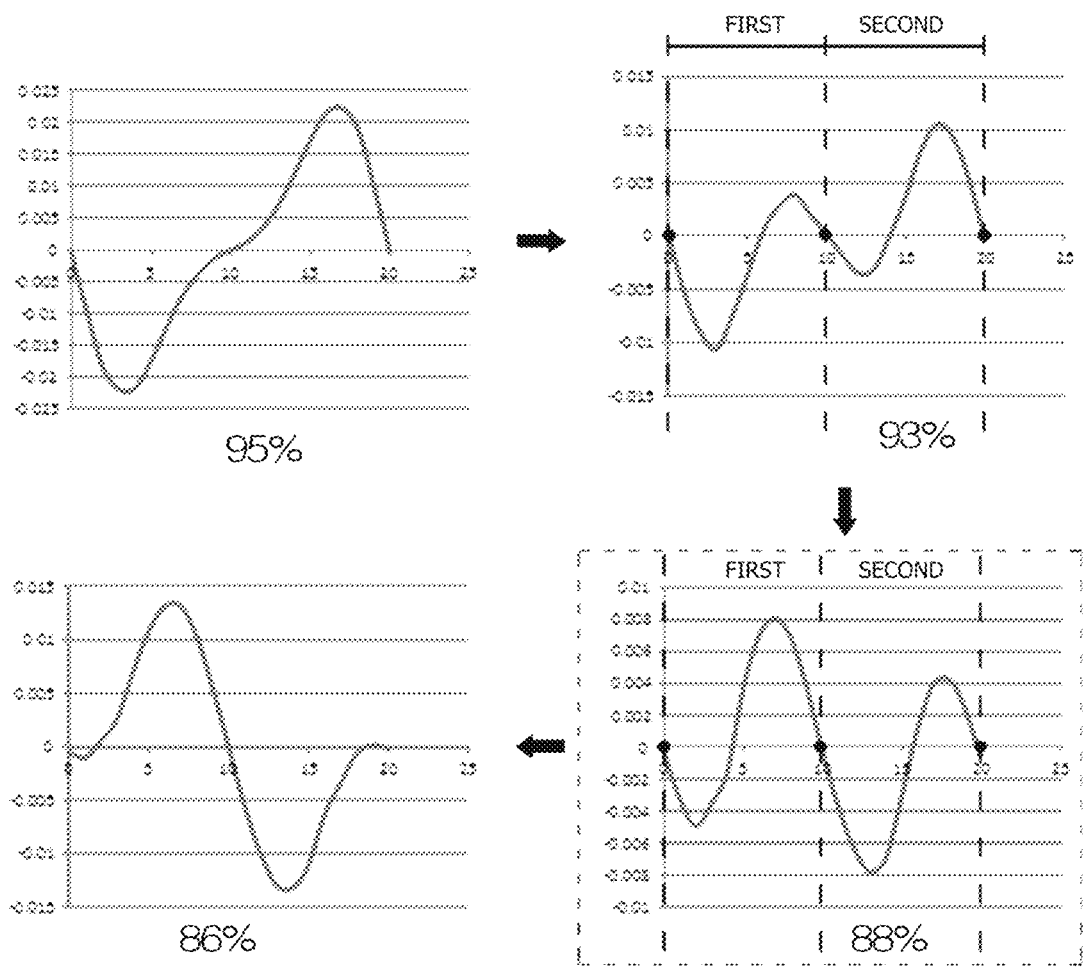
FIG. 8 shows graphs showing changes in the cogging torque wave according to the decreasing ratio of the magnet width.

FIG. 8 shows graphs showing changes in the cogging torque wave according to the decreasing ratio of the width of the magnet.

Referring to FIG. 8, when the width of the magnet 200 set on the basis of the first angle R1 is defined as 100%, as the width of the magnet 200 decreases, the cogging torque wave is deformed. That is, as the ratio of the second angle R2 to the first angle R1 is changed from 95% to 86%, the cogging torque wave is deformed.

In a case in which the ratio of the second angle R2 to the first angle R1 is 95%, the number of vibrations of the cogging torque wave is changed to one within the period of 20°, which is not changed, but in a case in which the ratio of the second angle R2 to the first angle R1 decreases to 93%, the cogging torque wave is deformed so that the number of vibrations of the cogging torque wave becomes two within the period of 20°, and the cogging torque begins to greatly decrease.

Next, in a case in which the ratio of the second angle R2 to the first angle R1 decreases to 88%, the number of vibrations of the cogging torque wave becomes two such that the cogging torque becomes lowest within the period of 20°.

Next, in a case in which the ratio of the second angle R2 to the first angle R1 decreases to 86%, the cogging torque wave is deformed so that the number of vibrations of the cogging torque wave becomes one, and the cogging torque begins to increase again within the period of 20°.

Accordingly, when the width of the magnet 200 is decreased such that the ratio of the second angle R2 to the first angle R1 becomes 88%, the cogging torque may be most effectively decreased.

Figure 9:
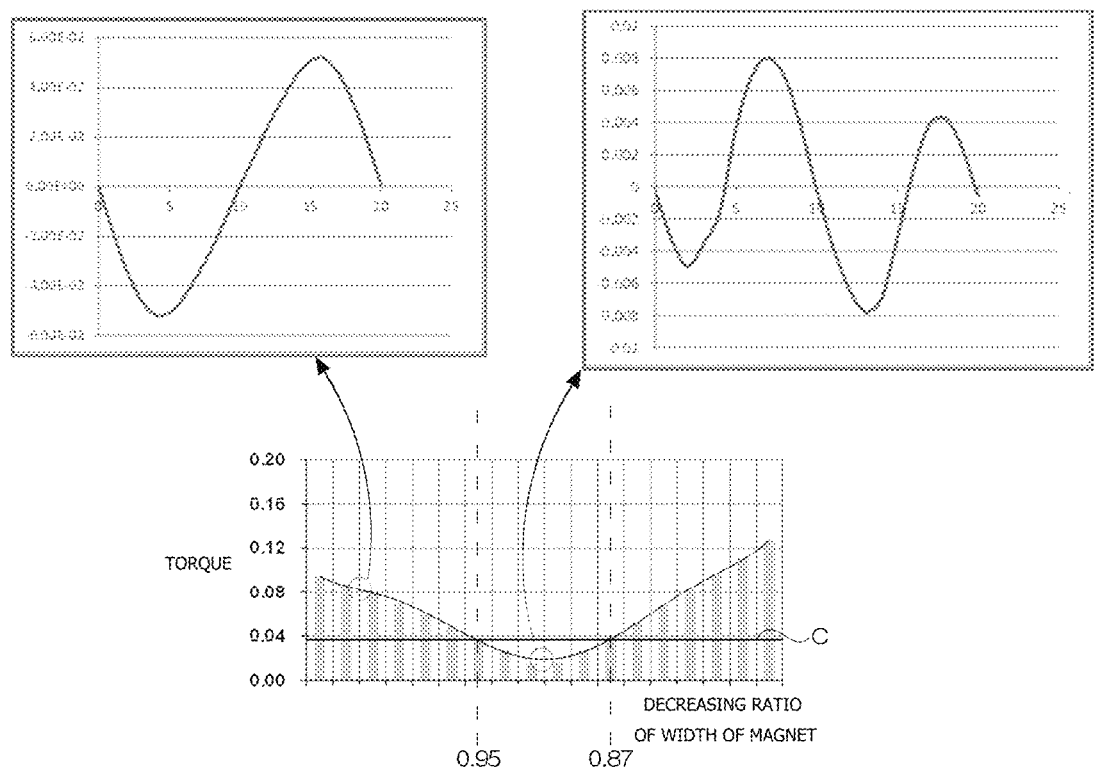
FIG. 9 shows graphs showing a ratio of the second angle to the first angle and shapes of the cogging torque waves in a meaningful section in which the cogging torque is reduced.

FIG. 9 shows graphs showing a ratio of the second angle to the first angle and shapes of the cogging torque waves in a meaningful section in which the cogging torque is reduced.

Referring to FIG. 9, within a section in which the ratio of the second angle R2 to the first angle R1 is in the range of 0.87 to 0.93, it can be seen that the number of vibrations of the cogging torque wave increases to two such that the cogging main degree is doubled.

In addition, since the number of vibrations of the cogging torque wave is maintained to be one so that the cogging main degree is not changed within sections in which the ratio of the second angle R2 to the first angle R1 is not in the range of 0.87 to 0.93, it can be seen that the cogging torque may not be decreased to be lower than a target reference value.

Figure 10:
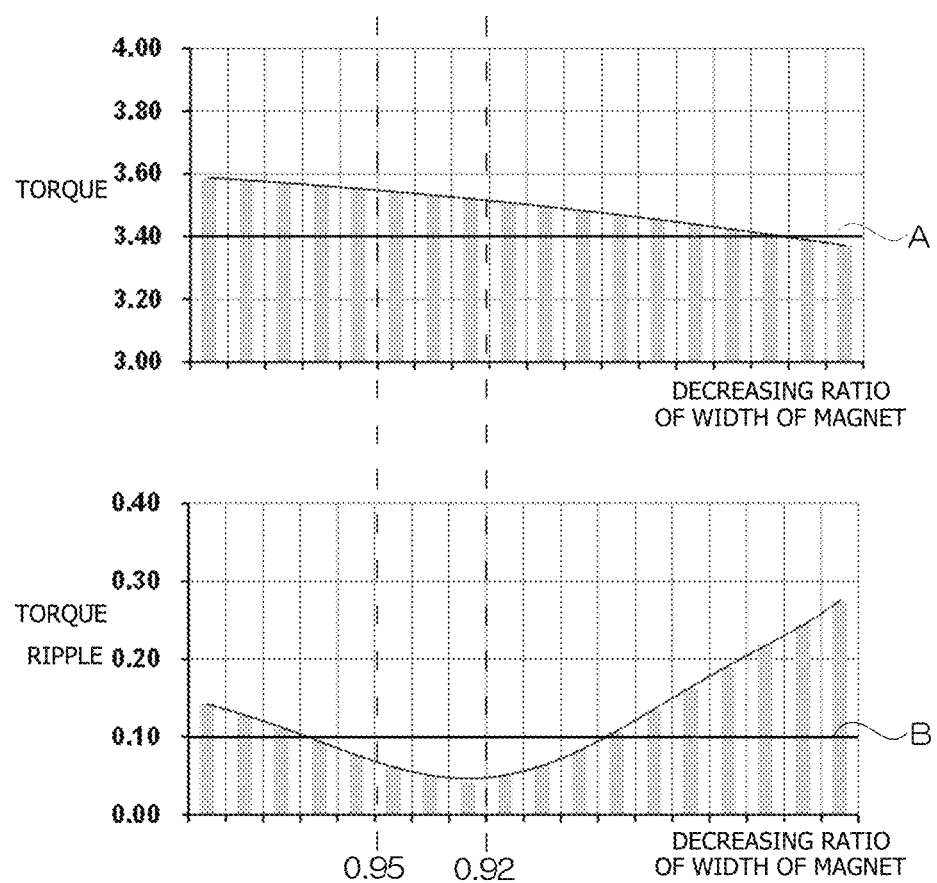
FIG. 10 shows comparative graphs showing the values of the torque and the torque ripple corresponding to the decreasing ratio of the magnet width.

FIG. 10 shows comparative graphs showing the values of the torque and the torque ripple corresponding to the decreasing ratio of the magnet width.

Referring to FIG. 10, in the case of the 6-pole 9-slot motor, it can be seen that the torque ripple, which is lower than the reference line B representing the target reference of the torque ripple, is measured at a point at which the ratio of the second angle R2 to the first angle R1 is in the range of 0.92 to 0.95.

In addition, it can be seen that the torque, which is higher than the reference line A representing the target reference of the torque, is measured, thereby satisfying the desired torque at the point at which the ratio of the second angle R2 to the first angle R1 is in the range of 0.92 to 0.95.

Figure 11:
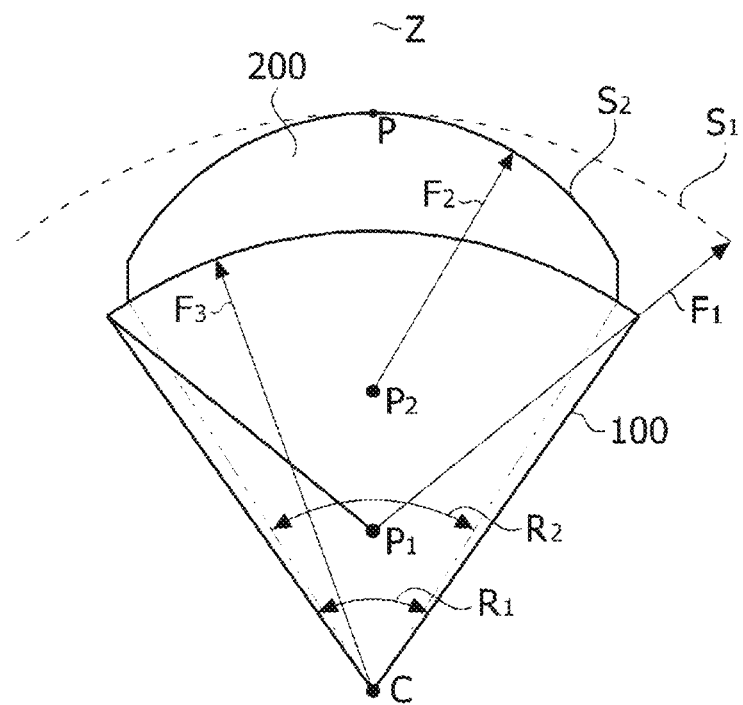
FIG. 11 is a view illustrating an optimal shape of an outer circumferential surface of the magnet for decreasing the torque ripple.

FIG. 11 is a view illustrating an optimal shape of an outer circumferential surface of the magnet for decreasing the torque ripple.

Referring to FIG. 11, a point, which is farthest from a center C of the rotor core 100 and is positioned on the outer circumferential surface of the magnet 200, is referred to as a point P of FIG. 11. In addition, a virtual reference line connecting the center C of the rotor core 100 and the point P of FIG. 11 is referred to as a reference line Z of FIG. 11.

Generally, the outer circumferential surface of the magnet 200 is designed to be disposed along a circumference S1 of FIG. 11. The circumference S1 of FIG. 11 is a line representing a circumference having a radius F1 which is a distance from a first circle center point P1, which is positioned on the reference line Z and is spaced apart from the center C of FIG. 11, to the point P of FIG. 11.

On the other hand, the outer circumferential surface of the magnet 200 of the rotor according to the embodiment is designed to be disposed along a circumference S2 of FIG. 11. The circumference S2 of FIG. 11 is a line representing a circumference having a first radius F2 which is a distance from a second circle center point P2 positioned on the reference line Z and is spaced apart from the center C of FIG. 11, to the point P of FIG. 11. Here, the second circle center point P2 is disposed outside the first circle center point P1 in a radius direction of the rotor core 100.

Such a shape of the outer circumferential surface of the magnet 200 is formed so as to reduce the torque ripple in the high-speed condition.

Figure 12:
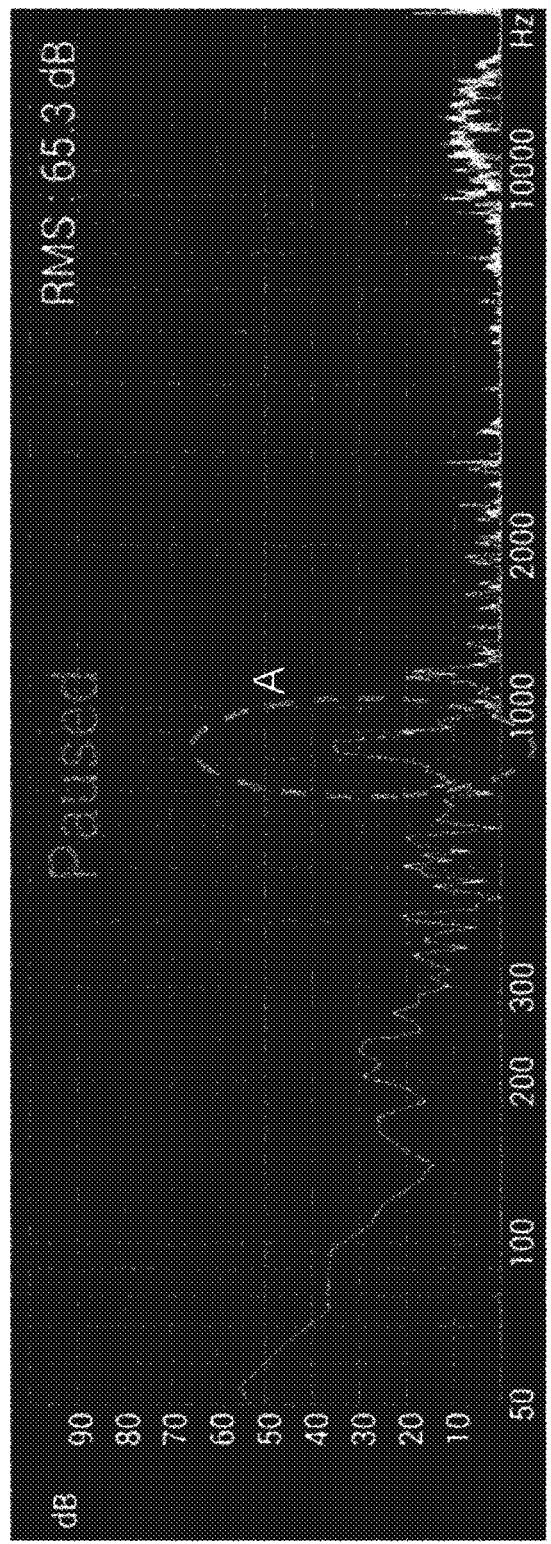
FIGS. 12 and 13 are graphs showing torque ripples occurring in a high-speed rotation condition.
Figure 13:
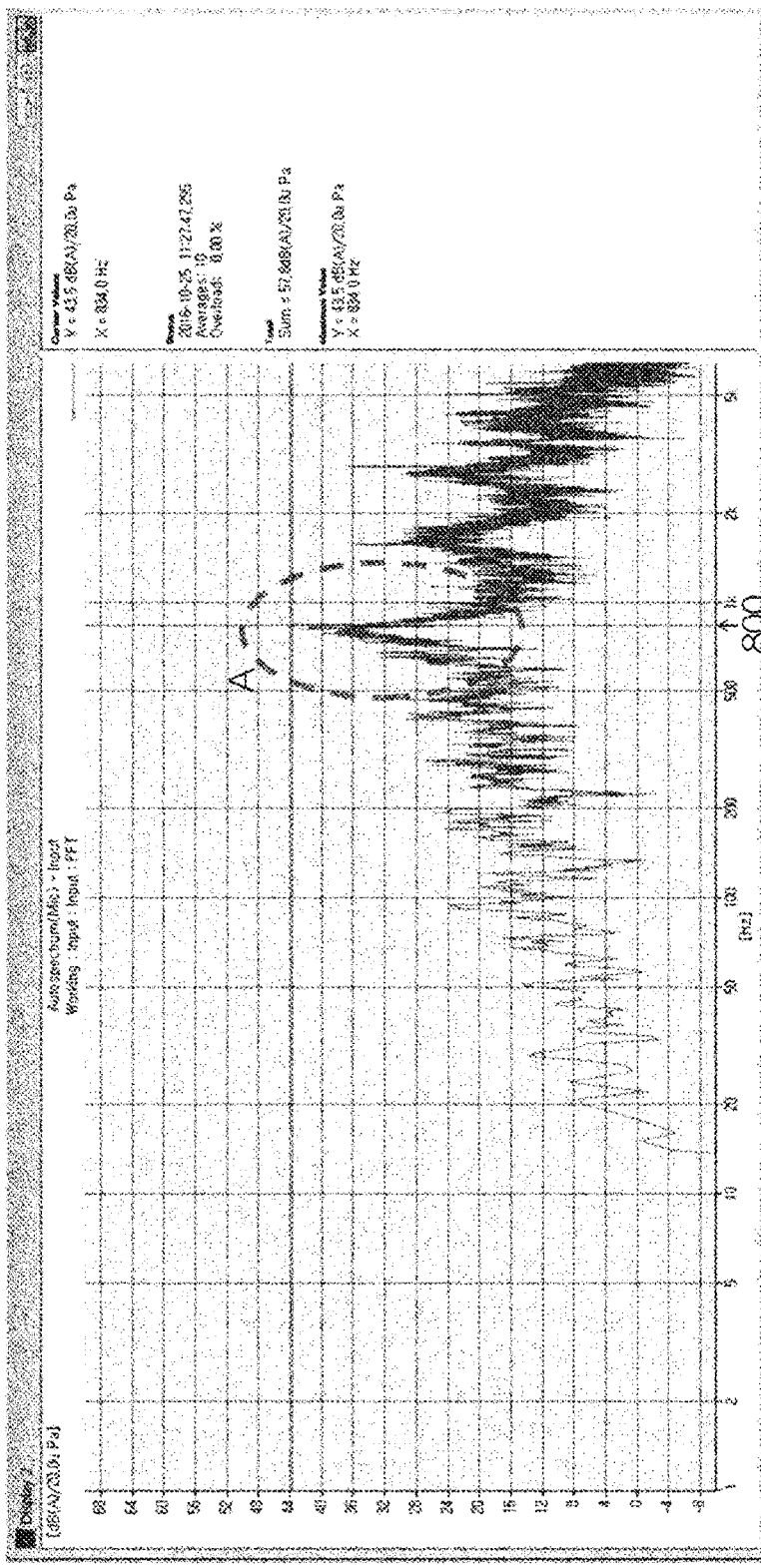

FIGS. 12 and 13 are graphs showing torque ripples occurring in a high-speed rotation condition.

Referring to FIGS. 12 and 13, in the case of the motor including the magnet having the outer circumferential surface formed along the circumference S1 of FIG. 11, like a portion A of FIG. 12 and as illustrated in FIG. 7A, it can be seen that noise is greatly increased at an 800 Hz band. The 800 Hz represents a state in which the corresponding motor rotates at 2900 rpm, and it can be seen that the torque ripple greatly increases in a high-speed condition.

Referring to FIG. 11, in the rotor according to the embodiment, the shape of the outer circumferential surface of the magnet 200 is changed to have a radius of a curvature like the circumference S2 of FIG. 11 which is less than an outer circumferential surface of a general magnet in order to decrease the torque ripple.

Specifically, when the second radius F3 is referred to as one, the magnet 200 may be designed such that the first radius F2 is in the range of 0.5 to 0.7. Here, the first radius F2 is a radius of a curvature of the outer circumferential surface of the magnet 200, that is, a distance from the second circle center point P2 to the point P of FIG. 11, and the second radius F3 corresponds to a radius of a curvature of the inner circumferential surface of the magnet 200.

For example, when the distance from the center C of the rotor core 100 to the point P of FIG. 11 is 20 mm, the first radius F2 may be 11.2 mm, and the second radius F3 may be 17.2 mm. Accordingly, the distance from the center C of the rotor core 100 to the second circle center point P2 corresponds to 8.8 mm, A measurement result of the cogging torque and torque ripple of the motor having the six poles and nine slots will be described below.

FIG. 14 is a comparison table in which a cogging torque and a torque ripple of a comparative embodiment and the cogging torque and the torque ripple of the embodiment are compared.

Referring to FIG. 14, an MW of FIG. 14 represents the ratio of the second angle R2 to the first angle R1, and an MOF of FIG. 14 represents the distance from the center C of the rotor core 100 to the second circle center point P2.

In the case of the comparative embodiment, there are conditions that a ratio of a second angle R2 to a first angle R1 is 0.885, and a distance from a center C of a rotor core 100 to a second circle center point P2 is 5.3 mm.

In the case of the embodiment, there are conditions that the ratio of the second angle R2 to the first angle R1 is 0.93, and the distance from the center C of the rotor core 100 to the second circle center point P2 is 8.8 mm.

In the above-described conditions, measurement results of the cogging torque, the torque ripple, and the torque of each of the comparative embodiment and the embodiment will be described below.

First, there were no large differences in maximum torque between the comparative and embodiments. However, the cogging torque and the torque ripple greatly decreased. Particularly, the high-speed torque ripple greatly decreased from 0.1758 Nm (in the comparative embodiment) to 0.0054 Nm (in the embodiment). This was much lower than a target reducing value of the torque ripple.

Figure 15:
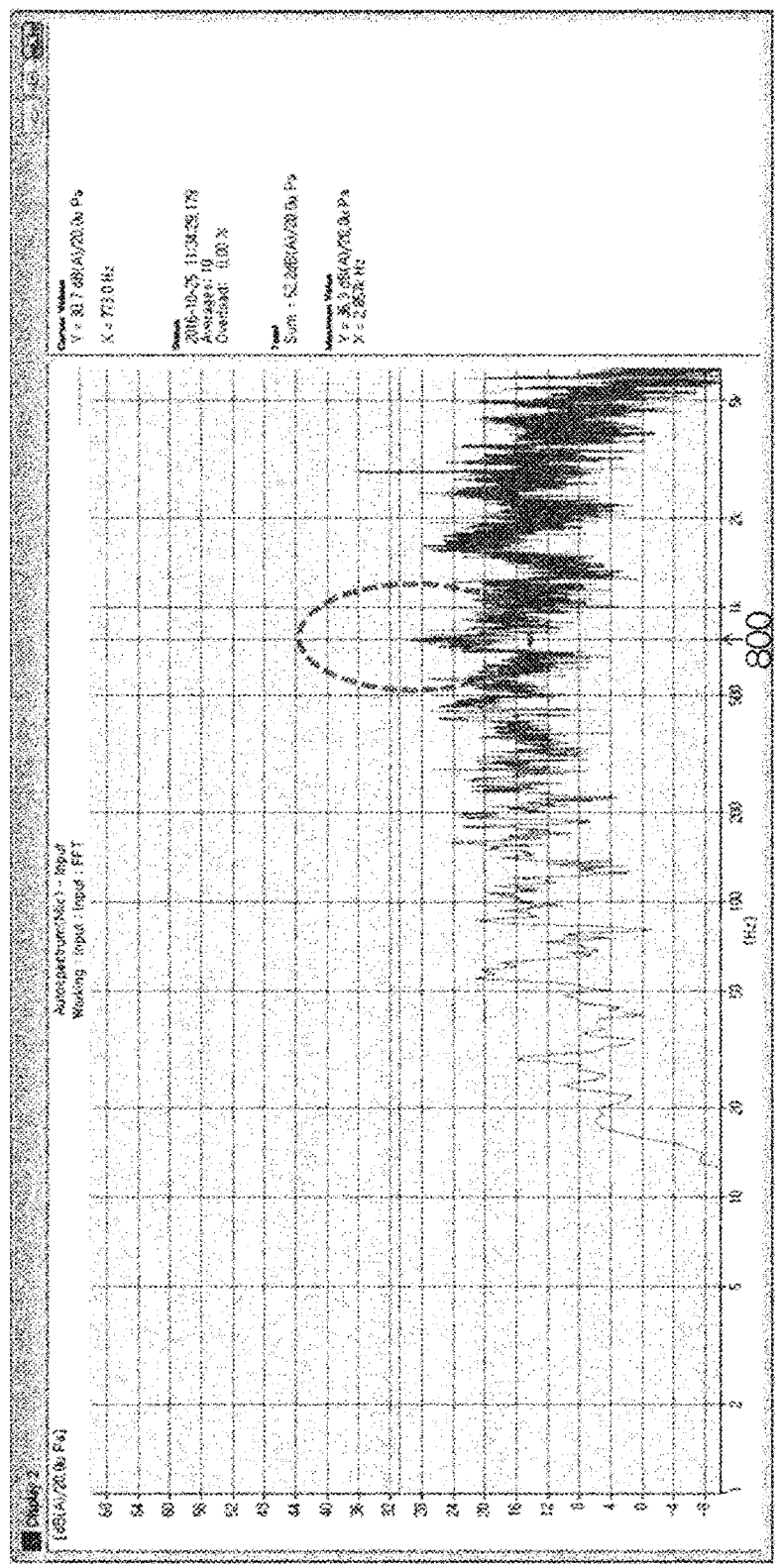
FIG. 15 is a graph showing the torque ripple of the motor in the high-speed rotation condition according to the embodiment.

FIG. 15 is a graph showing the torque ripple of the motor in the high-speed rotation condition according to the embodiment.

Referring to FIG. 15, unlike the portion A of FIG. 13, in 800 Hz band, noise greatly decreased so that the torque ripple reduced.

As described above, the rotor and the motor including the same according to one exemplary embodiment of the present invention has been described in detail with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The scope of the present invention should be interpreted by the appended claims and encompass all equivalents falling within the scope of the appended claims.

| REFERENCE NUMERALS | |
|---|---|
| 10: ROTOR | 20: STATOR |
| 21: TEETH | 30: ROTATING SHAFT |
| 40: SENSING MAGNET | 50: PRINTED CIRCUIT BOARD |
| 60: CAN MEMBER | 100: ROTOR CORE |
| 200: MAGNET | 210: INNER CIRCUMFERENTIAL SURFACE |

The invention claimed is:

1. A rotor comprising:
a rotor core having a cylindrical shape; and
a plurality of magnets disposed to surround an outer circumferential surface of the rotor core,
wherein each magnet includes an inner circumferential surface in contact with the outer circumferential surface of the rotor core, and when a first angle is defined by dividing an angle formed by the outer circumferential surface of the rotor core by a number of the magnets, and a second angle is formed by a first extension line and a second extension line that extend from both end points of the inner circumferential surface of each respective magnet to a center point of the rotor core on cross sections of the rotor core and each respective magnet, a ratio of the second angle to the first angle is configured to be in a range of 0.87 to 0.93 to decrease cogging torque of the rotor, and
wherein, when a radius of a curvature of an outer circumferential surface of each respective magnet is referred to as a first radius and a radius of a curvature of the inner circumferential surface of each respective magnet is referred to as a second radius on cross sections of the rotor core and each respective magnet, a ratio of the first radius to the second radius is configured to be greater than or equal to 0.5 and smaller than 0.6 to decrease torque ripple of the rotor.

2. The rotor of claim 1, wherein:
the plurality of magnets is disposed in a single stage on the outer circumferential surface of the rotor core; and
the plurality of magnets is disposed to be spaced apart by a predetermined distance from each other.

3. The rotor of claim 2, wherein a height of the rotor core is same as that of the magnets based on a longitudinal section of the rotor core and a longitudinal section of the magnets.

4. A motor comprising:
a rotating shaft;
a rotor including a hole into which the rotating shaft is inserted; and
a stator disposed outside the rotor,
wherein the rotor includes a rotor core that surrounds the rotating shaft and a magnet disposed on an outer circumferential surface of the rotor core, the stator includes a stator core having a plurality of teeth, and a number of vibrations of a cogging torque wave per unit rotation is two times as much as a least common multiple of a number of magnets and a number of teeth,
wherein the magnet includes an inner circumferential surface in contact with the outer circumferential surface of the rotor core, and
wherein when a first angle is defined by dividing an angle formed by the outer circumferential surface of the rotor core by the number of magnets, a second angle is formed by a first extension line and a second extension line that extend from both end points of the inner circumferential surface of each respective magnet to a center point of the rotor core on cross sections of the rotor core and each respective magnet, a ratio of the second angle to the first angle is in a range of 0.87 to 0.93, and
wherein, when a radius of a curvature of an outer circumferential surface of each respective magnet is referred to as a first radius and a radius of a curvature of the inner circumferential surface of each respective magnet is referred to as a second radius on cross sections of the rotor core and each respective magnet, a ratio of the first radius to the second radius is configured to be greater than or equal to 0.5 and smaller than 0.6 to decrease torque ripple of the rotor.

5. A motor comprising:
a rotating shaft;
a rotor including a hole into which the rotating shaft is inserted; and
a stator disposed outside the rotor,
wherein the rotor includes a rotor core that surrounds the rotating shaft and a magnet disposed on an outer circumferential surface of the rotor core, the magnet includes an inner circumferential surface in contact with the outer circumferential surface of the rotor core, and when a first angle is defined by dividing an angle formed by the outer circumferential surface of the rotor core by a number of magnets, and a second angle is formed by a first extension line and a second extension line that extend from both end points of the inner circumferential surface of each respective magnet to a center point of the rotor core on cross sections of the rotor core and each respective magnet, a ratio of the second angle to the first angle is configured to be in a range of 0.87 to 0.93 to decrease cogging torque of the rotor, and wherein, when a radius of a curvature of an outer circumferential surface of each respective magnet is referred to as a first radius and a radius of a curvature of the inner circumferential surface of each respective magnet is referred to as a second radius on cross sections of the rotor core and each respective magnet, a ratio of the first radius to the second radius is configured to be greater than or equal to 0.5 and smaller than 0.6 to decrease torque ripple of the rotor.

6. The motor of claim 5, wherein a number of vibrations of a cogging torque wave per unit rotation is two times as much as a least common multiple of the number of magnets and a number of teeth.

7. A rotor comprising:
a rotor core having a cylindrical shape; and
a plurality of magnets disposed to surround an outer circumferential surface of the rotor core,
wherein each magnet includes an inner circumferential surface in contact with the outer circumferential surface of the rotor core, and when a first angle is defined by dividing an angle formed by the outer circumferential surface of the rotor core by a number of magnets, and a second angle is formed by a first extension line and a second extension line that extend from both end points of the inner circumferential surface of each respective magnet to a center point of the rotor core on cross sections of the rotor core and each respective magnet, a ratio of the second angle to the first angle is configured to be in a range of 0.92 to 0.95 to decrease cogging torque of the rotor, and
wherein, when a radius of a curvature of an outer circumferential surface of each respective magnet is referred to as a first radius and a radius of a curvature of the inner circumferential surface of each respective magnet is referred to as a second radius on cross sections of the rotor core and each respective magnet, a ratio of the first radius to the second radius is configured to be greater than or equal to 0.5 and smaller than 0.6 to decrease torque ripple of the rotor.

8. The rotor of claim 7, wherein a center of a curvature of the outer circumferential surface of each respective magnet is disposed outside a center of a curvature of the inner circumferential surface of each respective magnet in a radial direction of the rotor core.

9. The rotor of claim 8, wherein the center of the curvature of the outer circumferential surface of each respective magnet is colinear with the center of the curvature of the inner circumferential surface of each respective magnet in the radial direction of the rotor core.

10. The rotor of claim 7, wherein:
the plurality of magnets is disposed in a single stage on the outer circumferential surface of the rotor core; and
the plurality of magnets is disposed to be spaced apart by a predetermined distance from each other.

11. The rotor of claim 10, wherein a height of the rotor core is the same as that of the magnets on the basis of a longitudinal section of the rotor core and a longitudinal section of the magnets.

12. A rotor comprising:
a rotor core having a cylindrical shape; and
a plurality of magnets disposed to surround an outer circumferential surface of the rotor core,
wherein each magnet includes an inner circumferential surface in contact with the outer circumferential surface of the rotor core, and when a radius of a curvature of the outer circumferential surface of each respective magnet is referred to as a first radius and a radius of a curvature of the inner circumferential surface of each respective magnet is referred to as a second radius on cross sections of the rotor core and each respective magnet, a ratio of the first radius to the second radius is configured to be greater than or equal to 0.5 and smaller than 0.6 to decrease torque ripple of the rotor.

13. The rotor of claim 12, wherein:
when a first angle is defined by dividing an angle formed by the outer circumferential surface of the rotor core by a number of magnets, and a second angle is formed by a first extension line and a second extension line that extend from both end points of the inner circumferential surface of each respective magnet to a center point of the rotor core on cross sections of the rotor core and each respective magnet,
a ratio of the second angle to the first angle is in a range of 0.92 to 0.95.

14. A motor comprising:
a rotating shaft;
a rotor including a hole into which the rotating shaft is inserted; and
a stator disposed outside the rotor,
wherein the rotor includes a rotor which surrounds the rotating shaft and a magnet disposed on an outer circumferential surface of the rotor core, and the stator includes a stator core having a plurality of teeth, the magnet includes an inner circumferential surface in contact with the outer circumferential surface of the rotor core, and when a first angle is defined by dividing an angle formed by the outer circumferential surface of the rotor core by a number of magnets, and a second angle is formed by a first extension line and a second extension line which extend from both end points of the inner circumferential surface of each respective magnet to a center point of the rotor core on cross sections of the rotor core and each respective magnet, a ratio of the second angle to the first angle is configured to be in a range of 0.92 to 0.95 to decrease cogging torque of the rotor, and
wherein, when a radius of a curvature of an outer circumferential surface of each respective magnet is referred to as a first radius and a radius of a curvature of the inner circumferential surface of each respective magnet is referred to as a second radius on cross sections of the rotor core and each respective magnet, a ratio of the first radius to the second radius is configured to be greater than or equal to 0.5 and smaller than 0.6 to decrease torque ripple of the rotor.

15. A motor comprising:
a rotating shaft;
a rotor including a hole into which the rotating shaft is inserted; and
a stator disposed outside the rotor,
wherein the rotor includes a rotor core which surrounds the rotating shaft, and a magnet disposed on an outer circumferential surface of the rotor core, the magnet includes an inner circumferential surface in contact with the outer circumferential surface of the rotor core, and when a radius of a curvature of an outer circumferential surface of the magnet on cross sections of the rotor core and the magnet is referred to as a first radius and a radius of a curvature of the inner circumferential surface of the magnet is referred to as a second radius on cross sections of the rotor core and the magnet, a ratio of the first radius to the second radius is configured to be greater than or equal to 0.5 and smaller than 0.6 to decrease torque ripple of the rotor.

16. The rotor of claim 15, wherein:

when a first angle is defined by dividing an angle formed by the outer circumferential surface of the rotor core by a number of magnets, and a second angle is formed by a first extension line and a second extension line that extend from both end points of the inner circumferential surface of each respective magnet to a center point of the rotor core on cross sections of the rotor core and each respective magnet, a ratio of the second angle to the first angle is in a range of 0.92 to 0.95.

\* \* \* \* \*